US009485959B2

(12) United States Patent
 Lucky

(10) Patent No.: US 9,485,959 B2
(45) Date of Patent: Nov. 8, 2016

(54) PET FEEDING DEVICE

(71) Applicant: Chad Lucky, Dothan, AL (US)

(72) Inventor: Chad Lucky, Dothan, AL (US)

( * ) Notice: Subject to any disclaimer, the term of this patent is extended or adjusted under 35 U.S.C. 154(b) by 0 days.

(21) Appl. No.: 14/251,268

(22) Filed: Apr. 11, 2014

(65) Prior Publication Data

US 2015/0122185 A1    May 7, 2015

Related U.S. Application Data

(60) Provisional application No. 61/901,384, filed on Nov. 7, 2013.

(51) Int. Cl.
 *A01K 5/01* (2006.01)
 *A01K 7/00* (2006.01)
 *A01K 7/04* (2006.01)

(52) U.S. Cl.
 CPC ............... *A01K 5/0142* (2013.01); *A01K 7/00* (2013.01); *A01K 7/04* (2013.01)

(58) Field of Classification Search
 CPC ............ A01K 5/0114; A01K 5/0135; A01K 5/0142; A01K 5/0291; A01K 7/005; A01K 7/04; A01K 7/06; A01K 9/005; A01K 39/0213; A01K 39/024; A01K 39/04
 USPC .......... 47/82–83, 39–40, 41.14, 47; 119/475, 119/51.01, 51.5, 71, 61.5, 61.57, 78
 See application file for complete search history.

(56) References Cited

U.S. PATENT DOCUMENTS

| | | | |
|---|---|---|---|
| 3,340,851 A | | 9/1967 | Frank et al. |
| 4,274,365 A | * | 6/1981 | Peters ....................... A01K 7/04 119/78 |
| 4,399,772 A | * | 8/1983 | Salinas ................ A01K 5/0142 119/51.5 |
| 4,628,867 A | * | 12/1986 | Brougham ............... A01K 7/04 119/78 |
| 5,222,990 A | | 6/1993 | Elliott |
| 5,277,149 A | * | 1/1994 | East ......................... A01K 7/00 119/51.5 |
| 5,467,738 A | * | 11/1995 | Cass ..................... A01K 5/0142 119/51.12 |
| 5,588,394 A | | 12/1996 | Balistreri |

(Continued)

*Primary Examiner* — Christopher Hutchens
(74) *Attorney, Agent, or Firm* — Global Intellectual Property Agency, LLC; Daniel Boudwin

(57) ABSTRACT

Described is a pet feeding device having an elongated post that can be secured in or on the ground in a vertical orientation. A water bowl has a central aperture through which the elongated post can be positioned such that the water bowl is positioned on the ground. A feeding bowl support is secured to the elongated post in an elevated position and holds one or more food bowls thereon. A hose can be secured to a tube that extends through the water bowl, through the elongated post, and is attached to a faucet disposed on the elongated post in order to provide water for a pet. A nipple is positioned on the outlet of the faucet, and excess water from the nipple drips into the water bowl. A cover is disposed on the top portion of the elongated post and provides shelter for the pet's food and water.

10 Claims, 4 Drawing Sheets

(56) References Cited

U.S. PATENT DOCUMENTS

| | | | | |
|---|---|---|---|---|
| 5,743,212 A * | 4/1998 | Forjohn | A01K 45/002 119/69.5 |
| 5,842,437 A * | 12/1998 | Burns | A01K 7/00 119/74 |
| 5,996,142 A * | 12/1999 | Colman | E03B 9/20 239/276 |
| 6,401,656 B1 * | 6/2002 | Adkisson | A01K 5/0114 119/51.01 |
| 6,973,895 B2 * | 12/2005 | Johnston | A01K 7/04 119/51.5 |
| 7,146,929 B2 | 12/2006 | Ritchey et al. | |
| 7,284,499 B1 * | 10/2007 | Kuster | A01K 5/0114 119/51.5 |
| 7,353,775 B1 * | 4/2008 | Stelmach | A01K 1/04 119/61.54 |
| 2006/0022189 A1 * | 2/2006 | Collins | E04H 17/20 256/65.14 |
| 2006/0096545 A1 * | 5/2006 | Cone | A01K 5/0142 119/61.53 |
| 2007/0227461 A1 | 10/2007 | Chern | |
| 2013/0145690 A1 * | 6/2013 | Cannon | A01G 9/023 47/66.7 |
| 2013/0334377 A1 * | 12/2013 | Lee | A01K 5/0114 248/146 |

* cited by examiner

PET FEEDING DEVICE

CROSS REFERENCE TO RELATED APPLICATION

This application claims the benefit of U.S. Provisional Application No. 61/901,384 filed on Nov. 7, 2013, entitled "Meal Time Feeder." The above identified patent application is herein incorporated by reference in its entirety to provide continuity of disclosure.

BACKGROUND OF THE INVENTION

Field of the Invention

The present invention relates to pet feeding devices. More specifically, the present invention describes a pet feeding device comprising a water bowl at the base of an elongated post and one or more food bowls attached to the elongated post at an elevated position. The present invention further includes an umbrella-like cover on the top of the elongated post to shelter and protect the pet's food and water. Further, a hose can be connected to the present invention such that water is supplied to a faucet attached to the elongated post and on which a nipple is disposed.

Pet owners must make arrangements so that their pets are taken care of when the pet owners are away from their home for an extended period of time. Pet owners may leave their house and their pet in order to go on vacation, to travel for business, or for any of a variety of other reasons. In order to make sure the pet is provided with food and water while the pet owner is away, the pet owner must either hire a pet sitter, or must pay to board the pet in a kennel. These options may be expensive for pet owners, and the pet may become uncomfortable in a new environment or in the presence of new people. Instead, many pet owners may simply leave enough food and water for their pet while the pet owner is away. However, leaving food and water out in the open may attract bugs and other pests, and may cause the water and food to become stale. Further, the pet owner may inaccurately estimate how much food and water to leave for their pet while the pet owner is away.

Pet owners often position pet food and water bowls outdoors on a patio, near a dog house, or in the pet's enclosure. Thus, the food and water bowls are exposed to direct sunlight, which may cause the food and water to become warm and unpalatable. This is particularly true in summer months during which temperatures are the highest. Further, placing food and water bowls outdoors exposes the food and water bowls to rain and other weather, which may cause the water bowl to overflow, and the food to become soggy. In addition to food spoilage due to weather, food bowls placed on the ground are easily accessible by ants and other insects. Similarly, birds, squirrels or other animals may avail themselves to the pet's food or water.

The present invention discloses a pet feeding device that maintains a pet's food and water in a single area, and helps to protect the pet's food and water. An elongated post is secured on or in the ground, and a water bowl having a central opening is positioned over the elongated post, and is positioned on the ground. One or more food bowls are disposed in an elevated position by a food bowl support secured to the elongated post. Further, a cover is disposed on the top end of the elongated post and provides shade for the pet's food and water, and helps to prevent exposure of the food and water to rain. The present invention also includes a water dispensing system that includes a faucet with a nipple thereon from which a pet may drink. Water can be supplied to the faucet by means of a hose secured to the water bowl and connected to a tube that extends through the elongated post.

Description of the Prior Art

Devices have been disclosed in the prior art that relate to pet feeding devices. These include devices that have been patented and published in patent application publications. These devices generally relate to automated pet feeding devices. The following is a list of devices deemed most relevant to the present disclosure, which are herein described for the purposes of highlighting and differentiating the unique aspects of the present invention, and further highlighting the drawbacks existing in the prior art.

One such prior art device is U.S. Patent Application Publication No. 2007/0227461 to Chern which discloses a pet house comprising a surrounding wall and a roof defining a lodging room suited to accommodate a pet therein. A food storage is provided within the roof frame for storing food, and the pet house can dispense food and water stored within the pet house. A hose is connected to the water dispenser to provide water for the pet to drink. The pet may step on a pedal to cause food to be dispensed, or the device may provide a control panel that allows a user to predetermine when and how much food will be dispensed. Thus, Chern fails to disclose a pet feeding device having an elongated post on which a food bowl is positioned.

U.S. Pat. No. 5,588,394 to Balistreri discloses an automatic animal feeder having a food reservoir that can deliver a fixed amount of dry food to a feed bin when a rotary feed mechanism is rotated. Water is provided to the device and is stored in a tank. The pull of gravity due to the weight increase in the tank causes the rotary mechanism to rotate, dispensing food. A microprocessor is used to control a water solenoid valve that controls the flow of water, which also serves to dispense water for the pet. Thus, Balistreri fails to provide a pet feeding device having a water bowl disposed at the bottom of a centrally located elongated post, and one or more feeding bowls disposed on the elongated post. Instead, Balistreri discloses a system for automatically feeding a pet a fixed amount of food and water as determined by a microprocessor.

U.S. Pat. No. 7,146,929 to Ritchey et al. discloses a pet bowl having a swinging cover to protect the food in the bowl from birds. The pet bowl also has a water channel surrounding the food bowl that helps to protect ants or other insects from reaching the food within the bowl. In some embodiments of the invention in Ritchey et al., the pet bowl further includes a watering dish that is sized to allow pets to drink from. Thus, Ritchey et al. does not disclose a pet feeding device that has a faucet with a nipple thereon, providing a pet with a source of water, and wherein the faucet is fed water by connection to a hose.

U.S. Pat. No. 3,340,851 to Frank et al. discloses an automatic pet feeding device comprising a cabinet in which a food hopper is positioned. The food hopper is adapted to store a supply of dry pet food therein. The device includes a plate having several food containers thereon, and a means for rotating the plate so that the containers can be positioned to receive food from the hopper. When a container is aligned with an opening in a wall of the cabinet, the food therein will fall into a pet's food bowl. The cabinet also includes a water feeder operated by a floating valve that maintains a constant amount of water in a dish. Thus, Frank et al. discloses an automated pet feeding device, and does not disclose a device having the same structure and configuration of the present invention, wherein a water bowl is disposed at the base of an elongated post and food bowls are attached to the post in an elevated position.

Finally, U.S. Pat. No. 5,222,990 to Elliott discloses a pet feeding device having a housing that includes an angled roof disposed over a floor. The roof has a trough thereon to direct rainwater away from the floor. A food bowl is mounted within the floor, and a chute is directed from the back of the housing towards the food bowl, such that a user can fill the food bowl from an area behind the housing. Thus, Elliott fails to disclose a pet feeding device that includes a faucet with a nipple thereon that is adapted to provide fresh water for the pet, and wherein water is supplied by a hose connected to the device.

These prior art devices have several known drawbacks. Several pet feeding devices disclosed in the prior art include a housing having automated mechanisms therein for dispensing pet food and water to bowls. However, these devices are bulky and have a variety of moving components. Further, these devices do not provide a means for protecting or sheltering the food and water from insects and inclement weather. Thus, while the prior art pet feeding devices provide means to automatically feed a pet, these devices are limited in that they do not prevent ants and other crawling insects from gaining access to the food, and they do not prevent the food from becoming wet and soggy from rain.

In light of the devices disclosed in the prior art, it is submitted that the present invention substantially diverges in design elements from the prior art and consequently it is clear that there is a need in the art for an improvement to existing pet feeding devices. In this regard the instant invention substantially fulfills these needs.

SUMMARY OF THE INVENTION

In view of the foregoing disadvantages inherent in the known types of pet feeding devices now present in the prior art, the present invention provides a new pet feeding device wherein the same can be utilized for providing convenience for the user when providing food and water to a pet and sheltering the food and water from inclement weather and insects.

It is therefore an object of the present invention to provide a new and improved pet feeding device that has all of the advantages of the prior art and none of the disadvantages.

It is another object of the present invention to provide a pet feeding device that provides a cover to protect a pet's food and water from rain and direct sunlight, which may cause the food and water to become unfit for consumption.

Another object of the present invention is to provide a pet feeding device that provides a pet with a constant supply of fresh water by means of a nipple that is fed water from a hose.

Yet another object of the present invention is to provide a pet feeding device having one or more feeding bowls arranged in an elevated position to help prevent access of the food by ants or other crawling insects.

Another object of the present invention is to provide a pet feeding device that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
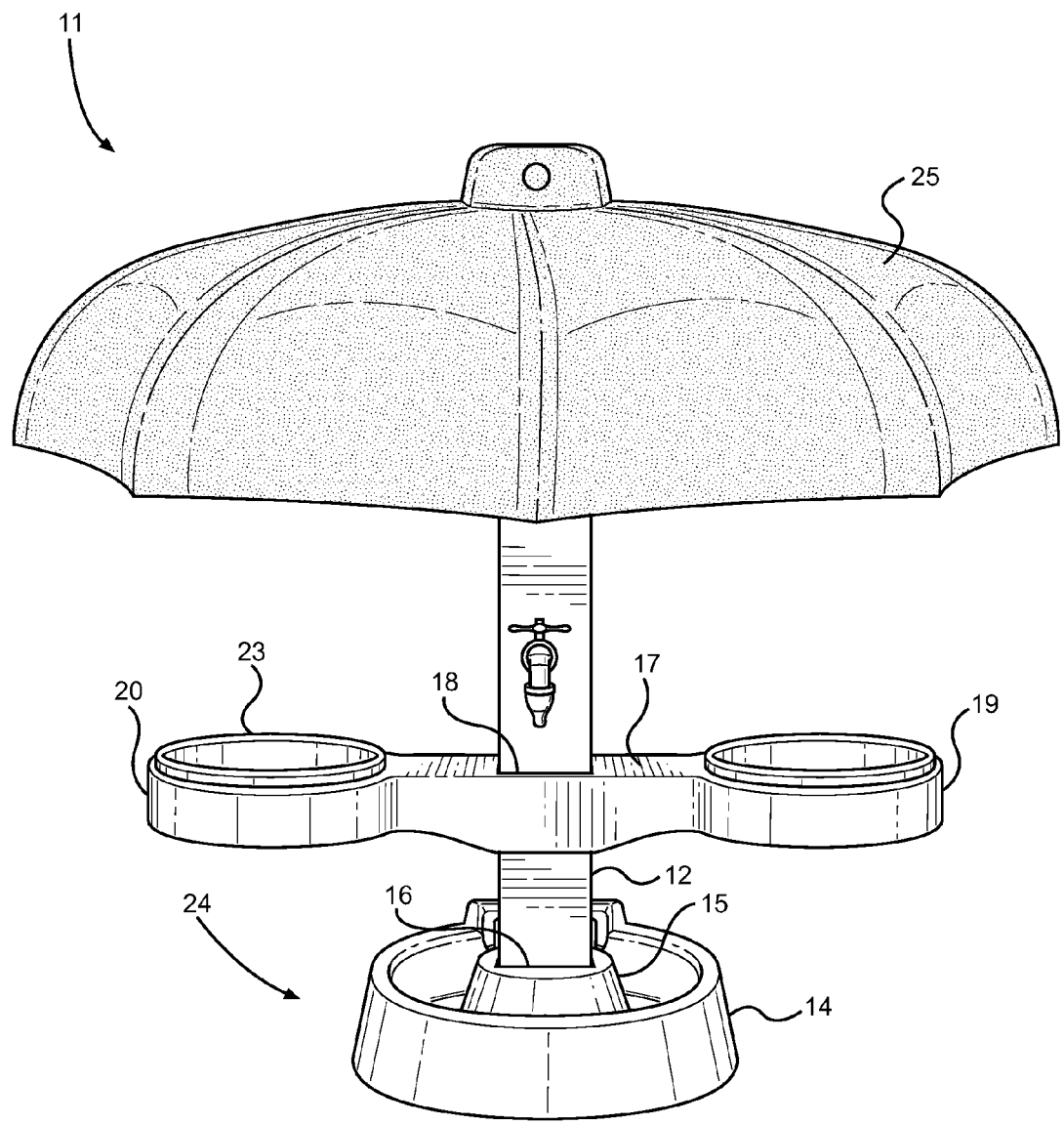
FIG. 1 shows a side view of the pet feeding device of the present invention in an assembled configuration.

Reference is made herein to the attached drawings. Like reference numerals are used throughout the drawings to depict like or similar elements of the pet feeding device. For the purposes of presenting a brief and clear description of the present invention, the preferred embodiment will be discussed as used for providing food and water to a pet while protecting and sheltering the food and water from sunlight, rain, and insects. The figures are intended for representative purposes only and should not be considered to be limiting in any respect.

Referring now to FIG. 1, there is shown a side view of the pet feeding device of the present invention in an assembled configuration. The pet feeding device 11 comprises an elongated post 12 having a first end adapted to be secured on or in the ground, and wherein the elongated post 12 is arranged vertically. In some embodiments of the present invention, the first end of the elongated post 12 comprises an attachment plate thereon. The attachment plate comprises a flat surface with apertures therethrough that are adapted to receive bolts or other similar fasteners. Any suitable means can be used for securing the elongated post 12 in an upright, vertical orientation. For example, the attachment plate can be secured to a weighted base plate that helps to maintain the elongated post 12 in an upright, vertical orientation. Alternatively, a user can secure fasteners within cement and secure the attachment plate to said fasteners.

The elongated post 12 preferably has a square cross section and a hollow interior. However, in alternate embodiments of the present invention, the elongated post 12 may have a circular cross section such that the elongated post 12 is substantially cylindrical. The elongated post 12 is composed of any suitable strong, durable material, including, but not limited to, hard plastic or metal. Additionally, the elongated post 12 may include a tubular cover disposed over the elongated post 12 that is composed of PVC or other similar material in order to provide the elongated post 12 with an aesthetically pleasing appearance.

A water bowl 24 is positioned near the first end of the elongated post 12 and on the ground. The water bowl 24 has a central opening 16 therethrough that is adapted to receive the elongated post 12. In this way, the elongated post 12 is located centrally in the water bowl 24, such that the water bowl 24 surrounds the elongated post 12. The water bowl 24 comprises a bottom, an outer wall 14, and an inner wall 15 disposed around the central opening 16. In this way, the water bowl 24 comprises an annular or ring-shaped channel adapted to hold water therein. In a preferred embodiment of the present invention, the outer wall 14 and inner wall 15 are shaped like concentric circles. Further, the central opening 16 is shaped similarly to the cross section of the elongated post 12 so that the elongated post 12 can be received through the central opening 16.

In some embodiments of the present invention, the water bowl 24 has a square protrusion on the outer wall 14 that provides additional space within the interior of the water bowl 24 for positioning of a tube and a valve that allows for the water bowl 24 to be refilled. In such embodiments, the water bowl 24 further includes a housing to cover the tube and valve, to prevent a pet from gaining access thereto. The water bowl 24 may further have an opening on the outer wall 14 that allows for connection to hose or other water source such that water can be provided to the pet feeding device 11.

The present invention further comprises a food bowl support 17 that is secured to the elongated post 12 at a position elevated above the ground. The food bowl support 17 can be secured to the elongated post 12 by means of an opening 18 that is located centrally on the food bowl support 17 and is adapted to receive the elongated post 12 therethrough. The food bowl support 17 can be secured to the elongated post 12 by means of any suitable fastener such as screws, nails, bolts, or adhesives. In a preferred embodiment of the present invention, the food bowl support 17 comprises a first end 19 opposite a second end 20. The first end 19 of the food bowl support 17 has an annular shape having an opening therethrough. Similarly, the second end 20 also has an annular shape with an opening therethrough. Thus, each of the ends of the food bowl support 17 have ring-shaped members thereon. A food bowl 23 having an outwardly extending rim about its upper perimeter is adapted to be positioned within the opening such that the food bowl 23 is suspended on the first end 19 or second end 20. The food bowl 23 is sized such that the rim of the food bowl 23 is wider than the opening so as to prevent the food bowl 23 from falling through the opening. In alternate embodiments of the present invention, the food bowl support only has one ring-shaped member thereon for receiving a food bowl.

The food bowl support 17 holds one or more food bowls 23 in an elevated position such that the food bowls 23 are conveniently accessible by a pet. Further, the elevated position of the food bowls 23 makes it difficult for crawling insects to reach the food bowl 23. Insects are also prevented from accessing the food bowls 23 by the water bowl 24 which functions as a moat by surrounding the elongated post 12, preventing or deterring insects from crawling up the elongated post 12.

The second end of the elongated post 12, corresponding to the top of the post, has a cover 25 disposed thereon. The cover 25 is sized so as to extend over the food bowl support 17 and water bowl 24. In this way, the cover 25 shields the food and water from direct exposure to sunlight, which may cause the food and water to become warm and unpalatable. Further, the cover 25 protects the food and water from rain which may cause the food to become soggy, or which can cause the water bowl 24 to overflow. In a preferred embodiment of the present invention, the cover 25 is shaped similarly to an umbrella and has a substantially circular shape and wherein the cover 25 turns downward towards the outer edges of the cover 25. The umbrella-like shape helps to direct rainwater off of the cover 25 and away from the food bowl 23 and water bowl 24. The cover 25 may be composed of a rigid, durable material such as a hard plastic. The cover 25 can be secured to the elongated post 12 by any suitable fastener such as screws, bolts, nails, or adhesives, among others.

Figure 2:
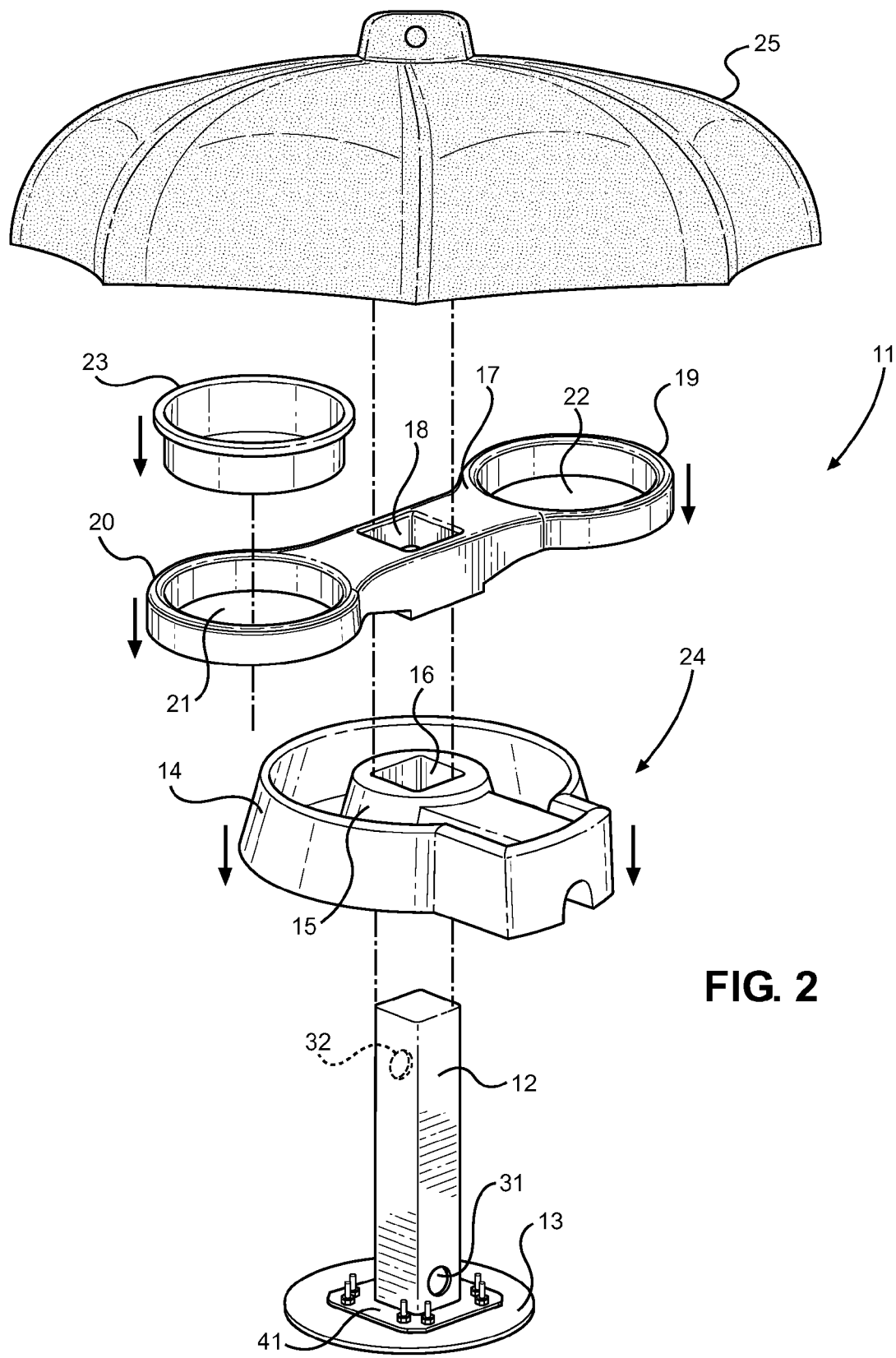
FIG. 2 shows a perspective view of the components of the pet feeding device in an unassembled configuration.

Referring now to FIG. 2, there is shown a perspective view of the components of the pet feeding device in an unassembled configuration. In some embodiments of the present invention, the first end of the elongated post 12 comprises an attachment plate 41 with a plurality of apertures therethrough. The elongated post 12 can be secured in an upright, vertical orientation by any suitable means. For example, the apertures on the attachment plate 41 can be aligned with a plurality of apertures disposed on a weighted base plate 13. The apertures are adapted to receive fasteners therethrough so that the elongated post 12 and a base plate 13 may be affixed to each other. In the illustrated embodiment, a base plate 13 comprises a flat disk, wherein the base plate 13 is constructed to provide support for the elongated post 12. To install the elongated post 12 in the ground, a user may dig a small hole and position the base plate 13 therein. Alternatively, the user may simply position the elongated post 12 and base plate 13 on the surface of the ground, and the weight of the base plate 13 is sufficient to maintain the elongated post 12 in an upright position even when the pet feeding device 11 is fully assembled. A weighted base plate 13 can be used to help prevent the elongated post 12 from tipping over during strong winds or storms. Alternatively, the user may attach the elongated post 12 and attachment plate 41 to fasteners disposed within cement on the ground so as to secure the elongated post 12 directly to the ground.

Once the elongated post 12 is positioned in the desired location, a water bowl 24 can then be placed over a second first end of the elongated post 12 and moved towards the first end of the elongated post 12, so that it can be positioned at the bottom of the elongated post 12 on the ground. The water bowl 24 may be secured to the elongated post 12 by any suitable fastener, however, the water bowl 24 does not need to be secured to the elongated post 12 because the water bowl 24 rests on the ground.

Next, the food bowl support 17 can be positioned over the second end of the elongated post 12, and can be secured in an elevated position above the ground by means of fasteners. Any type of conventional fastener may be used such as screws, nails, bolts, or adhesives. A food bowl 23 can be positioned within the first end 19 or second end 20 of the food bowl support 17 such that the food bowl 23 is held securely in place therein. The food bowls 23 are removably inserted such that the pet owner can remove the pet bowls 23 to clean or refill the pet bowls 23. Finally, the cover 25 is secured to the second end of the elongated post 12. The cover 25 can also be secured to the elongated post 12 in any conventional manner, including by means of screws, bolts, nails, or adhesives.

Additionally, the present invention comprises a water dispensing system. The elongated post 12 comprises an aperture 31 on the first end thereof through which a flexible tube connected to a water source can be positioned. The tube can extend through the hollow interior of the elongated post 12, and is used to provide fluid to a faucet mounted on the elongated post 12. A second aperture 32 is disposed at an elevated position on the elongated post 12 and allows the tube to provide water to the faucet.

Figure 3:
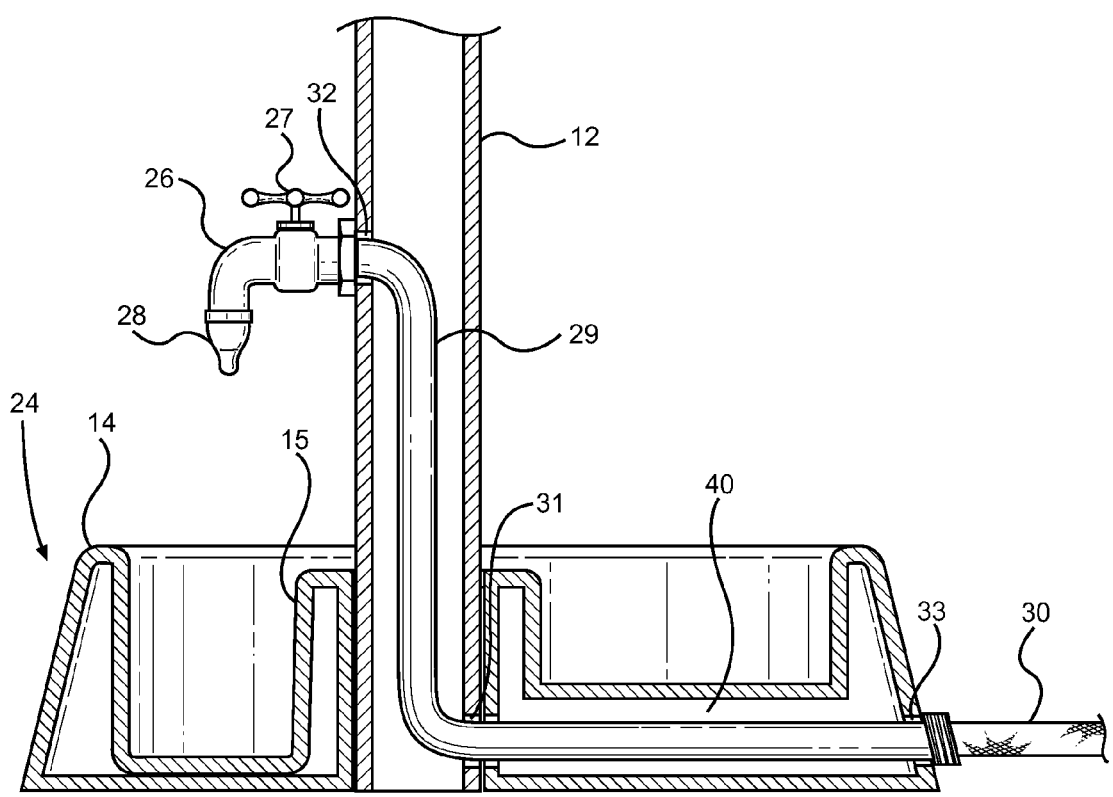
FIG. 3 shows a view of the water dispensing system of the present invention as arranged within the pet feeding device.

Referring now to FIG. 3, there is shown a view of the water dispensing system of the present invention as arranged within the pet feeding device. The present invention includes a water dispensing system for providing a pet with a supply of fresh water. A hose 30 can be secured to an opening 33 on the exterior of the water bowl 24. The opening 33 may have threading thereon for receiving the threaded end of a hose 30. The opening 33 allows for the hose 30 to be in fluid communication with a flexible tube 29 that extends through a channel 40 in the water bowl 24 and into the elongated post 12. The channel 40 in the water bowl 24 provides an enclosed region beneath the bottom of the water bowl 24, such that the flexible tube 29 extends through the channel 40 and does not contact the water within the water bowl 24.

The elongated post 12 comprises a faucet 26 thereon, and the flexible tube 29 is connected to the faucet 26. In this way, a hose 30 can be connected to the opening 33 on the water bowl 24 in order to supply fresh water to the faucet 26 mounted on the elongated post 12. The faucet 26 can be mounted on the elongated post 12 in any suitable manner, such as by securing the faucet 26 on a mounting bracket and using fasteners such as screws, bolts, or nails to attach the bracket and faucet to the elongated post 12. The faucet 26 comprises a control valve 27 that allows a user to control the flow rate of water through the faucet 26, or to turn the faucet 26 on or off. A nipple 28 is positioned on the opening of the faucet 26 and allows a pet to drink water therefrom. The nipple 28 is sufficiently porous that water is able to escape the nipple 28. The nipple 28 is durable so that the pet cannot easily rupture or tear the nipple 28. Any excess water that drips from the nipple 28, and that the pet does not consume, falls into the water bowl 24 below.

Figure 4:
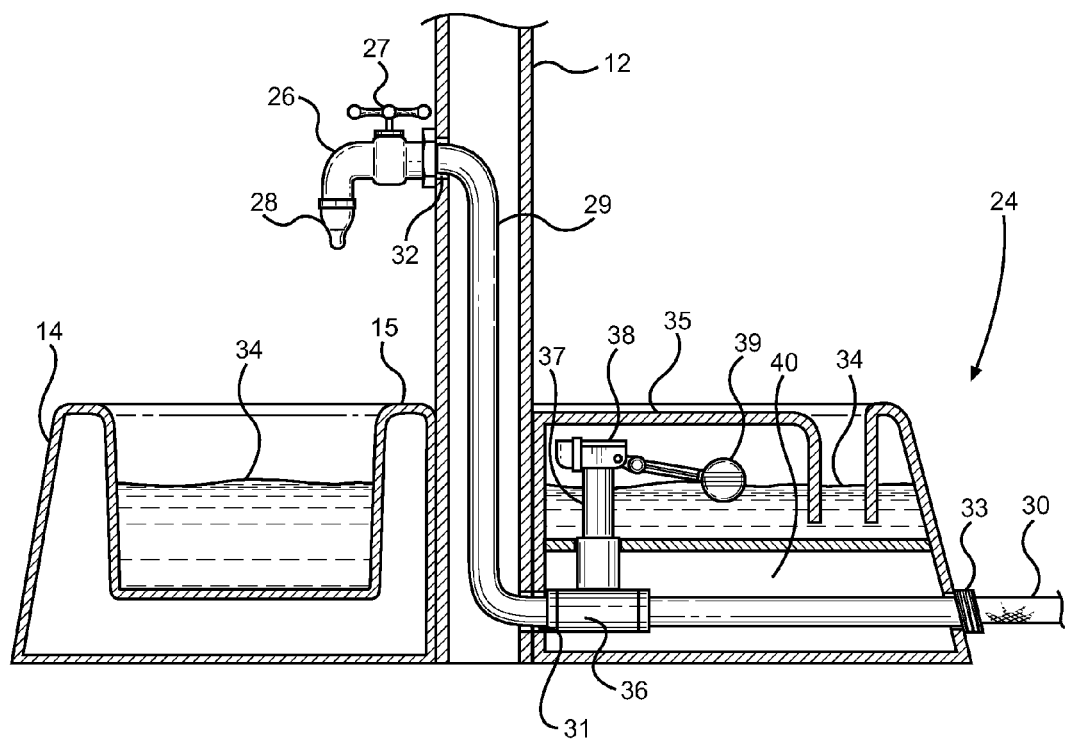
FIG. 4 shows a view of an alternate embodiment of the water dispensing system of the present invention having a float valve.

Referring now to FIG. 4, there is shown a view of an alternate embodiment of the water dispensing system of the present invention having a float valve. In the embodiment shown, the flexible tube 29 includes a T-joint 36 such that the tube 29 splits into two tubes. A first tube 29 connects to the faucet 26 on the elongated post 12 in the same manner as described above. A second tube 37 extends into the water bowl 24 so as to provide water thereto. The second tube 37 comprises a float valve 38 thereon that is adapted to control the water level 34 in the water bowl 24. The float valve 38 includes a buoyant float 39 that is positioned on the surface of the water 34 within the water bowl 24. As the water level 34 rises, the float 39 rises as well, and once a particular water level is reached the float valve 38 closes so that additional water is prevented from flowing into the water bowl 24. As the pet consumes the water or as the water evaporates, the water level 34 in the water bowl 24 drops, thereby lowering the float 39. This causes the float valve 38 to open, allowing water to flow into the water bowl 24. Further, the float 39 is partially enclosed by a housing 35 on the water bowl 24 such that the pet does not have access to the float 39 and the float valve 38. It is submitted that float valves and the manner of using the same to control the water level within a container or vessel is well known in the art.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pet feeding device, comprising:
   an elongated post having a first end and a second end, wherein said elongated post is disposed in a vertical orientation;
   a water bowl including an enclosed interior channel, a central opening, a base, an outer wall, and an inner wall which define an interior volume between said inner wall and said central opening;
   wherein the enclosed interior channel is disposed underneath the water bowl and is in communication with an aperture disposed on the second end of the elongated post;
   wherein said elongated post is positioned through said central opening of said water bowl;
   a plurality of food bowls;
   a food bowl support comprising a plurality of enclosed ring-shaped members, each of the plurality of enclosed ring-shaped members defining an enclosed opening, wherein each ring-shaped member is adapted to removably receive one of the plurality of food bowls therein;
   wherein said food bowl support is secured to said elongated post at an elevated position relative to the water bowl;
   a cover secured to said second end of said elongated post, the cover being sized to extend over both the food bowl support and the water bowl;
   a faucet mounted on the elongated post above the inner and outer walls of the water bowl, the faucet being positioned between the cover and the food bowl support;
   a tube having a first end and a second end, the tube extending through the elongated post and the enclosed interior channel of the water bowl;
   the first end of the tube being in fluid communication with the faucet;
   the second end of the tube being disposed on the outer wall of the water bowl;
   wherein the second end of the tube includes a threaded engagement.

2. The pet feeding device of claim 1, wherein said cover comprises an umbrella like shape.

3. The pet feeding device of claim 1, wherein said elongated post has a square cross section.

4. The pet feeding device of claim 1, wherein said elongated post is hollow.

5. The pet feeding device of claim 1, wherein said faucet comprises a control valve thereon adapted to control the flow of water through said faucet.

6. The pet feeding device of claim 1, wherein a porous nipple is disposed on said faucet.

7. The pet feeding device of claim 1, wherein said tube comprises a joint that splits said tube into a first tube that connects to said faucet, and a second tube that is adapted to provide water directly to said water bowl.

8. The pet feeding device of claim 7, further comprising a float valve positioned on said second tube and within said water bowl, wherein said float valve is adapted to control a water level within said water bowl.

9. The pet feeding device of claim 1, further comprising a base plate attached to said first end of said elongated post.

10. The pet feeding device of claim 9, wherein said first end of said elongated post comprises an attachment plate having a plurality of apertures thereon;
   said base plate comprises a plurality of apertures;
   wherein said plurality of apertures on said attachment plate align with said plurality of apertures on said base plate such that fasteners can be positioned therethrough to connect said attachment plate to said base plate.

\* \* \* \* \*